US012689776B2

(12) United States Patent
Su

(10) Patent No.: US 12,689,776 B2
(45) Date of Patent: Jul. 21, 2026

(54) METHOD AND DEVICE FOR PRELOADING LIVE STREAM IN VIDEO STREAM, AND STORAGE MEDIUM

(71) Applicant: BIGO TECHNOLOGY PTE. LTD., Mapletree Business City (SG)

(72) Inventor: Ruijia Su, Guangzhou (CN)

(73) Assignee: BIGO TECHNOLOGY PTE. LTD., Mapletree Business City (SG)

( * ) Notice: Subject to any disclaimer, the term of this patent is extended or adjusted under 35 U.S.C. 154(b) by 7 days.

(21) Appl. No.: 18/846,370

(22) PCT Filed: Mar. 13, 2023

(86) PCT No.: PCT/CN2023/081105
§ 371 (c)(1),
(2) Date: Sep. 12, 2024

(87) PCT Pub. No.: WO2023/179401
PCT Pub. Date: Sep. 28, 2023

(65) Prior Publication Data
US 2025/0193461 A1 Jun. 12, 2025

(30) Foreign Application Priority Data
Mar. 23, 2022 (CN) .......................... 202210293767.2

(51) Int. Cl.
*H04N 21/2187* (2011.01)
*H04N 21/231* (2011.01)
(Continued)

(52) U.S. Cl.
CPC ... *H04N 21/2187* (2013.01); *H04N 21/23106* (2013.01); *H04N 21/2402* (2013.01); *H04N 21/4852* (2013.01)

(58) Field of Classification Search
CPC ......... H04N 21/2187; H04N 21/23106; H04N 21/2401; H04N 21/2402; H04N 21/262;
(Continued)

(56) References Cited

U.S. PATENT DOCUMENTS 8,893,164 B1 * 11/2014 Teller ................. G06Q 30/0252
725/12
8,893,185 B2 * 11/2014 Wasilewski ............. H04L 63/08
726/28
(Continued)

FOREIGN PATENT DOCUMENTS

CN      103246526 A      8/2013
CN      108282236 A      7/2018
(Continued)

OTHER PUBLICATIONS

International search report of PCT application No. PCT/CN2023/081105 issued on Jun. 4, 2023.
(Continued)

*Primary Examiner* — Michael B. Pierorazio
(74) *Attorney, Agent, or Firm* — Dilworth & Barrese, LLP.; Michael J. Musella, Esq.

(57) ABSTRACT

Provided is a method for preloading a live stream in a video stream. The method includes:
acquiring current device environment information and current service environment information in response to detecting a preload trigger scenario being satisfied during play of video stream data, wherein the preload trigger scenario comprises: current play data being a short video and next play data being a live video in a case of switching play content by a swipe-up operation; or current play data being a short video and previous play data being a live video in a case of switching play content by a swipe-down operation; determining whether the device environment information meets a
(Continued)

S110
Acquiring current device environment information and current service environment information in response to detecting a preload trigger scenario being satisfied during play of video stream data S120
Determining whether the device environment information meets a preload device condition, and determining whether the service environment information meets a preload service condition S130
Preloading a live stream resource in response to determination results that the preload device condition and the preload service condition are met preload device condition, and determining whether the service environment information meets a preload service condition; and preloading a live stream resource in response to determination results that the preload device condition and the preload service condition are met.

20 Claims, 5 Drawing Sheets

(51) Int. Cl.
H04N 21/24 (2011.01)
H04N 21/485 (2011.01)
(58) Field of Classification Search
CPC ........... H04N 21/4331; H04N 21/4424; H04N 21/4852
See application file for complete search history.

(56) References Cited

U.S. PATENT DOCUMENTS

| | | | | |
|---|---|---|---|---|
| 9,622,133 | B1 | 4/2017 | Guvenc | |
| 10,334,314 | B1* | 6/2019 | Jimenez ............. | H04N 21/2187 |
| 10,536,743 | B2* | 1/2020 | Matejka ............. | H04N 21/4384 |
| 11,064,232 | B2* | 7/2021 | Mertens ............. | H04N 21/4223 |
| 11,653,036 | B2* | 5/2023 | Xue .......................... | H04N 7/14 |
| | | | | 709/219 |
| 2002/0085843 | A1* | 7/2002 | Mann ...................... | E03C 1/057 |
| | | | | 396/374 |
| 2003/0005454 | A1* | 1/2003 | Rodriguez ......... | H04N 21/2385 |
| | | | | 348/E7.071 |
| 2006/0256133 | A1* | 11/2006 | Rosenberg .............. | G06F 3/013 |
| | | | | 345/619 |
| 2007/0157247 | A1* | 7/2007 | Cordray ................. | G06Q 30/02 |
| | | | | 348/E5.006 |
| 2009/0133051 | A1* | 5/2009 | Hildreth ........... | H04N 21/42204 |
| | | | | 725/28 |
| 2009/0138805 | A1* | 5/2009 | Hildreth ............. | H04N 21/4755 |
| | | | | 715/745 |
| 2010/0058400 | A1* | 3/2010 | Nicas ................. | H04N 7/17318 |
| | | | | 725/74 |
| 2010/0118193 | A1* | 5/2010 | Boyden .................. | G09G 5/006 |
| | | | | 348/554 |
| 2010/0141578 | A1* | 6/2010 | Horiuchi .......... | H04N 21/42204 |
| | | | | 345/158 |
| 2011/0058105 | A1* | 3/2011 | Nagashima ........ | H04N 21/4318 |
| | | | | 348/602 |
| 2011/0138416 | A1* | 6/2011 | Kang ................. | H04N 21/4821 |
| | | | | 725/39 |
| 2012/0075168 | A1* | 3/2012 | Osterhout ............... | G06F 3/017 |
| | | | | 345/8 |
| 2012/0117103 | A1* | 5/2012 | Farrelly .................. | H04L 67/10 |
| | | | | 707/769 |
| 2012/0192234 | A1* | 7/2012 | Britt ................... | H04N 21/4882 |
| | | | | 725/98 |
| 2012/0324550 | A1* | 12/2012 | Wasilewski ........ | H04N 21/4661 |
| | | | | 726/5 |
| 2013/0014136 | A1* | 1/2013 | Bhatia .............. | H04N 21/44218 |
| | | | | 725/9 |
| 2013/0059601 | A1* | 3/2013 | Tran .................. | H04N 21/41407 |
| | | | | 455/456.1 |
| 2014/0359647 | A1* | 12/2014 | Shoemake ......... | H04N 21/6582 |
| | | | | 725/10 |
| 2014/0373057 | A1* | 12/2014 | Hoffert .............. | H04N 21/4312 |
| | | | | 725/100 |
| 2015/0019982 | A1 | 1/2015 | Petitt, Jr. et al. | |
| 2015/0026708 | A1* | 1/2015 | Ahmed ................ | H04N 21/812 |
| | | | | 725/12 |
| 2015/0106851 | A1* | 4/2015 | Pauli ...................... | G06F 3/0386 |
| | | | | 725/52 |
| 2015/0309687 | A1* | 10/2015 | Herigstad ............ | H04N 21/478 |
| | | | | 715/784 |
| 2015/0373408 | A1* | 12/2015 | Yurasits ................. | H04H 60/45 |
| | | | | 725/12 |
| 2016/0127786 | A1* | 5/2016 | Langer ............... | H04N 21/4542 |
| | | | | 725/28 |
| 2016/0323643 | A1* | 11/2016 | Panchaksharaiah ......................... | |
| | | | | H04N 21/4753 |
| 2017/0048286 | A1* | 2/2017 | Ichihashi .............. | H04L 65/611 |
| 2018/0035166 | A1* | 2/2018 | Truong ............. | H04N 21/4147 |
| 2018/0152761 | A1* | 5/2018 | Truong ............. | H04N 21/4524 |
| 2020/0020358 | A1* | 1/2020 | Bentley ................. | G11B 27/031 |
| 2022/0408138 | A1* | 12/2022 | Wu .................. | H04N 21/44227 |
| 2023/0045363 | A1* | 2/2023 | Zhu .................. | H04N 21/47217 |

FOREIGN PATENT DOCUMENTS

| | | |
|---|---|---|
| CN | 108769727 A | 11/2018 |
| CN | 110413510 A | 11/2019 |
| CN | 110418147 A | 11/2019 |
| CN | 110536144 A | 12/2019 |
| CN | 112153470 A | 12/2020 |
| CN | 112672186 A | 4/2021 |
| CN | 113365087 A | 9/2021 |
| CN | 113535063 A | 10/2021 |
| CN | 114827646 A | 7/2022 |
| EP | 3379836 A1 | 9/2018 |
| WO | 2014/090262 A1 | 6/2014 |
| WO | 2020/000973 A1 | 1/2020 |

OTHER PUBLICATIONS

China National Intellectual Property Administration, First office action of Chinese application No. 202210293767.2 issued on Jun. 13, 2023, which is foreign counterpart application of this US application.

Zhi Wang et al., Strategies of collaboration in multi-swarm peer-to-peer content distribution, Tsinghua Science and Technology, ISSN 1007-0214 03/12 pp. 29-39, vol. 17, No. 1, Feb. 2012, Feb. 29, 2012, entire document.

China National Intellectual Property Administration, Notification to grant patent right for invention of Chinese application No. 202210293767.2 issued on Nov. 7, 2022, which is foreign counterpart application of this US application.

* cited by examiner

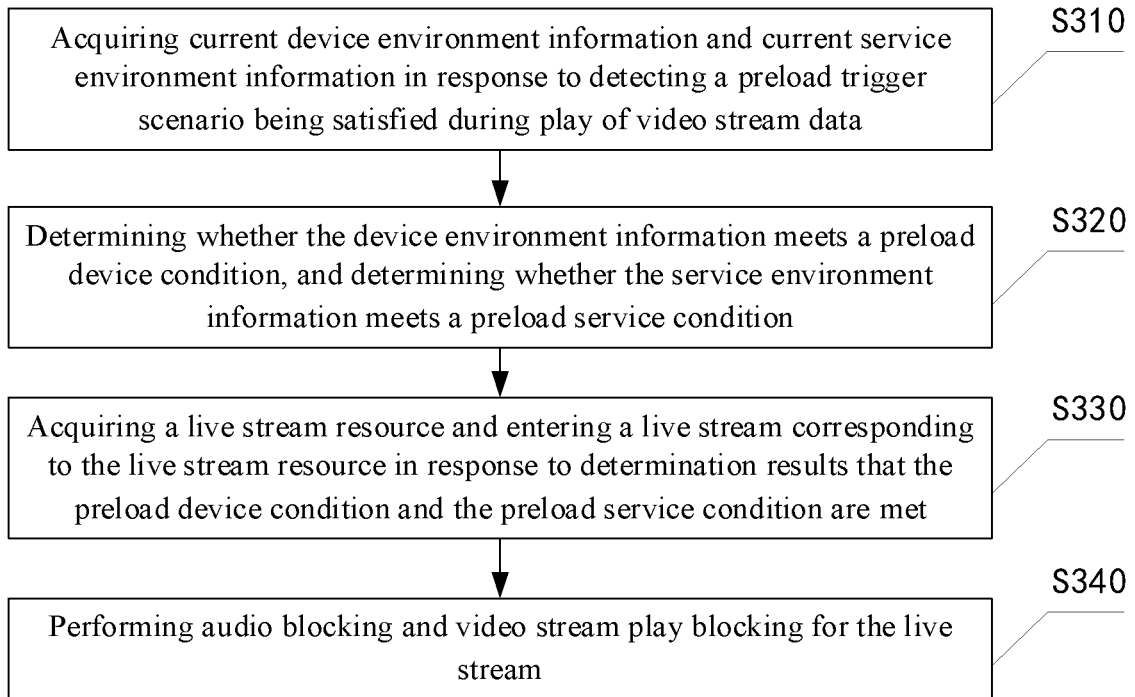

S310

Acquiring current device environment information and current service environment information in response to detecting a preload trigger scenario being satisfied during play of video stream data

S320

Determining whether the device environment information meets a preload device condition, and determining whether the service environment information meets a preload service condition

S330

Acquiring a live stream resource and entering a live stream corresponding to the live stream resource in response to determination results that the preload device condition and the preload service condition are met

S340

Performing audio blocking and video stream play blocking for the live stream

FIG. 3

METHOD AND DEVICE FOR PRELOADING LIVE STREAM IN VIDEO STREAM, AND STORAGE MEDIUM

CROSS-REFERENCE TO RELATED APPLICATION

The application is U.S. national stage of international application No. PCT/CN2023/081105, filed on Mar. 13, 2023, which claims priority to Chinese Patent Application No. 202210293767.2, filed on Mar. 23, 2022, the disclosures of which is are herein incorporated by reference in their entireties.

TECHNICAL FIELD

Embodiments of the present disclosure relate to the field of video processing technologies, and in particular, relate to a method, apparatus, and device for preloading a live stream in a video stream, and a storage medium.

BACKGROUND

With popularization and development of short video applications, video content and live content are often mixed in data consumption streams to enrich user experience. Many solutions are available for pre-download services of short videos. For example, one solution includes pre-downloading previous and next video files that are invisible on a play interface during playback of the short videos by users' swipe-up and swipe-down operations, preparing local file resources, and allowing users to quickly play back the video by their swipe operations. However, a similar preloading solution is not applicable to the scenario where the short videos are switched to live streams, because playback of the short videos is based on files but play of the live streams is based on real-time data streams.

SUMMARY

Embodiments of the present disclosure provide a method, an apparatus, and a device for preloading a live stream in a video stream, and a storage medium.

Some embodiments of the present disclosure provide a method for preloading a live stream in a video stream. The method includes:

acquiring current device environment information and current service environment information in response to detecting a preload trigger scenario being satisfied during play of video stream data, wherein the preload trigger scenario comprises: current play data being a short video and next play data being a live video in a case of switching play content by a swipe-up operation; or current play data being a short video and previous play data being a live video in a case of switching play content by a swipe-down operation; the device environment information comprises one or more of a network type, a network bandwidth, and a short video download bandwidth; and the service environment information comprises at least one of short video download data or short video cache data;

determining whether the device environment information meets a preload device condition, and determining whether the service environment information meets a preload service condition; and preloading a live stream resource in response to determination results that the preload device condition and the preload service condition are met.

Some embodiments of the present disclosure further provide a device for preloading a live stream in a video stream. The device includes: a processor, a memory, and one or more computer programs stored in the memory and runnable on the processor, wherein the processor, when loading and running the one or more computer programs, is caused to perform the method for preloading the live stream in the video stream as described in some embodiments of the present disclosure.

Some embodiments of the present disclosure further provide a non-transitory computer-readable storage medium storing one or more computer-executable instructions. The one or more computer-executable instructions, when loaded and executed by a processor of a computer, cause the computer to perform the method for preloading the live stream in the video stream as described in some embodiments of the present disclosure.

Some embodiments of the present disclosure further provide a computer program product. The computer program product includes a computer program, and the computer program is stored in a computer-readable storage medium. The computer program, when loaded from the computer-readable storage medium and executed by at least one processor of a device, causes the device to perform the method for preloading the live stream in the video stream as described in some embodiments of the present disclosure.

BRIEF DESCRIPTION OF THE DRAWINGS

FIG. 3 is a flowchart of another method for preloading a live stream in a video stream according to some embodiments of the present disclosure;

DETAILED DESCRIPTION

The embodiments of the present disclosure are described in detail hereinafter in conjunction with the accompanying drawings and the embodiments. It is understandable that the specific embodiments described herein are only for the purpose of illustrating the embodiments of the present disclosure and do not limit the embodiments of the present disclosure. It is further noted that for ease of description, only portions related to the embodiments of the present disclosure are shown in the accompanying drawings rather than the entire structure.

The terms "first," "second," and the like in the specification and claims of the present disclosure are used to distinguish between similar objects but are not used to describe a particular order or sequence. It should be understood that the data used in this way may be interchanged in some appropriate cases, such that the embodiments of the present disclosure can be carried out in an order other than the order illustrated or described herein. The objects distinguished by the terms "first," "second," and the like generally belong to one type and the number of the objects is usually not limited, e.g., the first object means the number of the first objects is one or more than one. In addition, the phrase "and/or" in the specification and the claims indicates at least one of the connected objects, and the character "/" generally indicates an "or" relationship between the associated objects.

In some practices, during switching from a short video to a live stream, loading of live stream resources starts in response to a whole page being switched to live data, a live streaming room is loaded and data streams are pulled, and live stream page data is rendered. However, because live streaming is a more complex service scenario, an instant load rate is not high, and both playback of the short videos and play of the live streams need to occupy a specific amount of network bandwidth. If a live streaming room is abruptly preloaded during playback of a short video, video stuttering is caused, both the short video preloading and the instant load rate deteriorate, and thus consumption experience of short videos is affected. Moreover, due to severe terminal fragmentation, that is, differences between the devices used by users for viewing short videos and live streams, the difficulty in preloading the live stream during playback of the short video is increased.

Figures 1, 2:
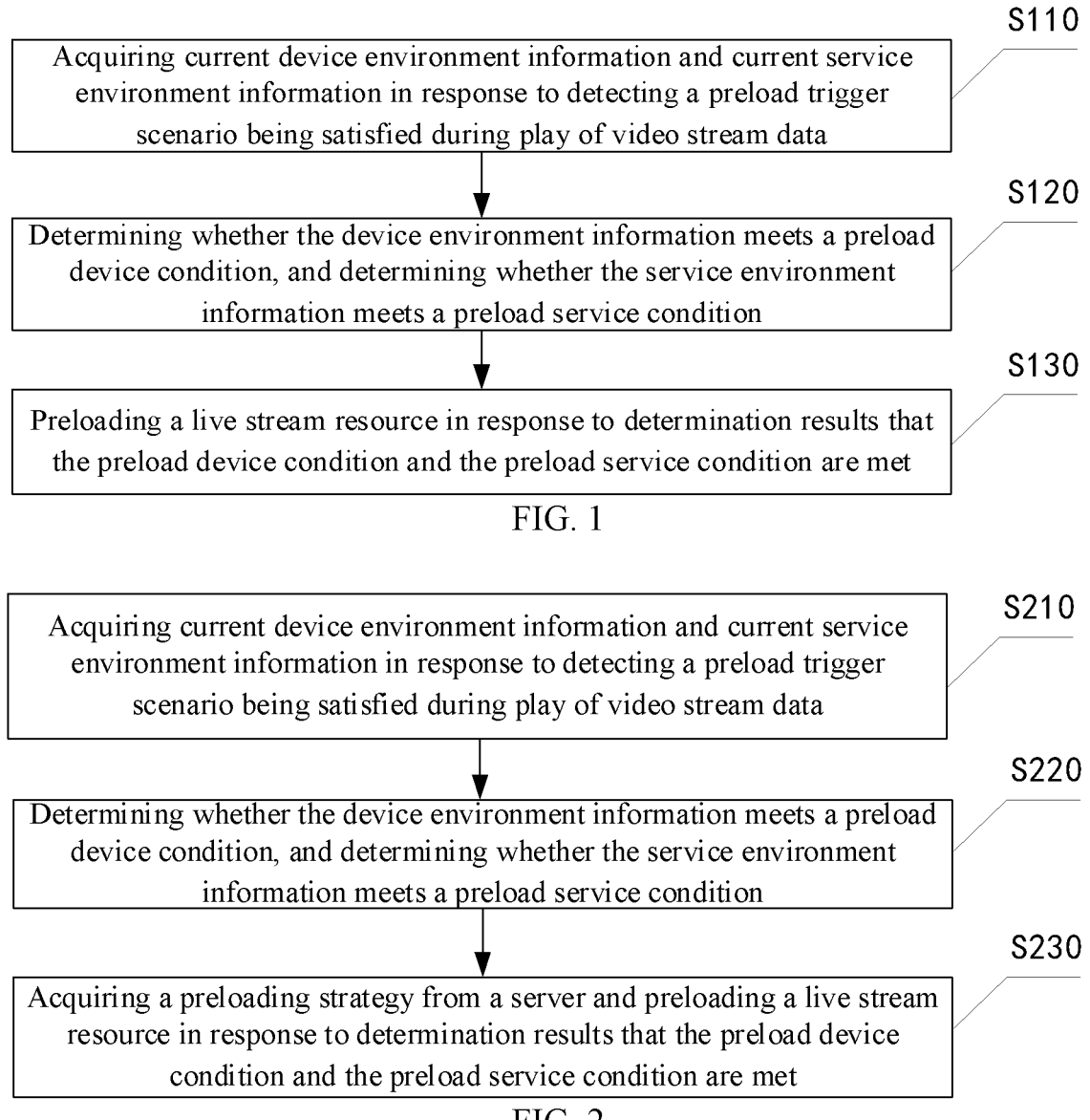
FIG. 1 is a flowchart of a method for preloading a live stream in a video stream according to some embodiments of the present disclosure.
FIG. 2 is a flowchart of another method for preloading a live stream in a video stream according to some embodiments of the present disclosure.

FIG. 1 is a flowchart of a method for preloading a live stream in a video stream according to some embodiments of the present disclosure. The method is employed for preloading a live stream resource during the play of the video stream data, which is performed by a computing device such as a smart terminal, a laptop, etc. The method specifically includes the following processes.

In process S110, current device environment information and current service environment information are acquired in response to detecting a preload trigger scenario being satisfied during play of video stream data.

In some embodiments, during the playback of the video stream data, i.e., during playback of a short video on the user device, in the case that the preload trigger scenario is detected, the current device environment information and the current service environment information are acquired. In some embodiments, the preload trigger scenario is configured to be a scenario where in case of switching play content by a swipe-up operation, current play data is a short video and next play data is a live video. It is understood that the swipe-up operation is to achieve switching the play content, that is, the user is capable of switching the play content by the swipe-up operation, such as, switching the short video that is currently being played, not played, or paused, to a next short video or a live video. For a user device such as a smart terminal, upon receiving swipe operation data corresponding to the swipe-up operation, the trigger condition is met in the case that the currently played video is a short video and the play data upon switching is a live video. It should be noted that the current play data being a short video means that the current data type is video stream data, but does not definitely mean that the short video is in a playback state, i.e., the short video is in one of the following three states: being played, not played, or paused.

In some embodiments, the preload trigger scenario is configured to be a scenario where in a case of switching the play content by a swipe-down operation, the current play data is a short video and the previous play data is a live video. It can be understood that the swipe-down operation is to achieve switching the play content, that is, the user is capable of switching the play content by the swipe-down operation, such as, switching the short video, that is, currently being played, not played, or paused, to the previous short video or live video. For a user device such as a smart terminal, upon receiving swipe operation data corresponding to the swipe-down operation, the trigger condition is met in the case that the current play data is a short video and the play data upon switching is a live video.

It should be noted that in the method according to some embodiments of the present disclosure, the user device is controlled to switch the play content in response to a user's swipe-left or swipe-right operation, and the preload trigger scenario is determined to be satisfied in the case that the current play data is a short video and the previous play data or the next play data is a live video.

In some embodiments, the device environment information includes one or more of a network type, a network bandwidth, and a short video download bandwidth, wherein the network type is the type of the network shown to be currently used by the user's device. For a smart terminal, such as a cellular phone, the network type is one of 2G, 3G, 4G, 5G, or Wi-Fi; for a computer such as a desktop computer, the network type is broadband or gateway, or the like. The network bandwidth is the bandwidth of the network currently used by the user's device, and the short video download bandwidth is the bandwidth occupied when downloading the short video. It is noted that, in some embodiments, the short video download bandwidth is represented as the ratio of bandwidth occupied when downloading the short video to the network bandwidth.

In some embodiments, the service environment information includes at least one of short video download data or short video cache data. It is understood that the short video download data is configured for determining whether the short video is completely downloaded. In some embodiments, the short video cache data includes at least one of a duration that the short video has been cached and played or a duration that the short video has been cached but not played. In some embodiment, the short video cache data further includes at least one of a proportion of the duration that the short video has been cached and played or a proportion of the duration that the short video has been cached but not played, wherein the proportion of the duration that the short video has been cached and played represents a ratio of the duration that the short video has been played to the duration that the short video has been cached, and the proportion of the duration that the short video has been cached but not played represents a ratio of the duration that the short video has not been played to the duration that the short video has been cached.

In process S120, whether the device environment information meets a preload device condition is determined, and whether the service environment information meets a preload service condition is determined.

In some embodiments, the preload device condition includes: determining whether the network type is a predetermined network type; determining whether the network bandwidth is greater than a predetermined network bandwidth threshold; or determining whether the short video download bandwidth is greater than a predetermined download bandwidth threshold. The preload device condition is defined to include at least one of the above conditions based on the above conditions, and the preload device condition is acquired by the user device from the cloud or a server, or is sent by the cloud or the server upon the user device sending a corresponding request to the cloud or the server.

In the case of determining whether the network type is the predetermined network type, the predetermined network type is one or more of 2G, 3G, 4G, 5G, or Wi-Fi for a smart terminal such as a cellular phone, or is a broadband network, a gateway, or the like for a computer such as a desktop computer. In some embodiments, the predetermined network type is defined to include 4G, 5G, or Wi-Fi; in the case that the current network type of the user device is 4G, it is determined that the network type is the predetermined network type and the preloaded device condition is met; and in the case that the current network type of the user device is 3G, it is determined that the network type of the user device is not the predetermined network type and the preloaded device condition is not met.

In the case of determining whether the network bandwidth is greater than the predetermined network bandwidth threshold, in some embodiments, the predetermined network bandwidth threshold is set to be 2 Mbps; in the case that the network bandwidth of the user device is 3 Mbps, the condition that the network bandwidth is greater than the predetermined network bandwidth threshold is met; and in the case that the network bandwidth of the user device is 1 Mbps, the network bandwidth of the user device is less than the predetermined network bandwidth threshold, and thus the preload device condition is not met.

In the case of determining whether the short video download bandwidth is greater than the predetermined download bandwidth threshold, in some embodiments, the short video download bandwidth is the bandwidth occupied when downloading the short video, and the predetermined download bandwidth threshold is set to 150 KB/s. Then, in the case that the current short video download bandwidth of the user device is 200 KB/s, it is determined that the short video download bandwidth is greater than the predetermined download bandwidth threshold; and in the case that the current short video download bandwidth of the user device is 100 KB/s, it is determined that the short video download bandwidth is less than the predetermined download bandwidth threshold, and the preload device condition is not met.

It should be noted that the predetermined network type, the predetermined network bandwidth threshold, and the predetermined download bandwidth threshold are set according to actual design needs. In the case that the preload device condition includes a plurality of settings, it is determined, only in the case that all of the settings are satisfied, that the device environment information meets the preload device condition.

In some embodiments, the preload service condition includes at least one of: determining, based on the short video download data, that the short video is completely downloaded; or determining, based on the short video cache data, that the duration that the short video has been cached but not played is greater than a predetermined time period.

In some embodiments, the short video download data is a message, generated upon successful download of the short video, for indicating the successful download. In the case that the message is received by the computing device, it is determined that the short video is completely downloaded.

The short video cache data includes a duration that the short video has been cached but not played, and the duration that the short video has been cached but not played is compared with a predetermined time period. In some embodiments, in the case that the short video has been downloaded for 5000 ms and the current duration that the short video has been played is 2000 ms, the duration that the short video has been downloaded but not played is 3000 ms. In the case that the predetermined time period is 2500 ms, it is determined that the duration that the short video has been cached but not played is satisfied to be greater than the predetermined time period. In some embodiments, it is determined whether the service environment information satisfies the preload service condition based on a ratio of the duration that the short video has been cached but not played to the duration that the short video has been cached, that is, by determining, based on the short video cache data, whether the duration that the short video has been cached but not played has a corresponding ratio greater than the predetermined ratio.

It should be noted that the predetermined time period is set according to the actual design needs. In the case that the preload service condition includes the above two settings, in the case that the short video is completely downloaded, the short video cache data is ignored, i.e., it is not necessary to determine, based on the short video cache data, whether the duration that the short video has been cached but not played is greater than the predetermined time period.

In process S130, a live stream resource is preloaded in response to the determination results that the preload device condition and the preload service condition are met.

In some embodiments, upon determining that the device environment information meets the preload device condition and determining that the service environment information meets the preload service condition, the computing device responsively preloads the live stream resource, such as acquiring the live stream resource and entering the live stream corresponding to the live stream resource. It is excepted that, for the live stream that needs to be preloaded, the user device acquires the live stream resources such as the live video encoding method, screen resolution, interface layout data, and live stream data, or the like to make preparations for entering the live stream.

As can be seen from the above solutions, during the play of the video stream data by the user device, it is detected whether the user device satisfies the preload trigger scenario. In the case that the user device satisfies the pre-trigger scenario, and the device environment information and the service environment information respectively meet the preload device condition and the preload service condition, the live stream resource is preloaded. In this way, the live stream is preloaded without affecting the consumption experience of the short video, the switching between the short video and the live data is natural and smooth, and the user's consumption experience of the short video and the live stream is improved.

In some embodiments, during the play of the video stream data, the current device environment information and the current service environment information are acquired in response to detecting a preload trigger scenario being satisfied and a preload trigger timing being satisfied, wherein the preload trigger timing includes that the short video is played up to a predetermined time point or a predetermined time interval point following the predetermined time point. It is understood that the time points satisfying the preload trigger timing include a predetermined time point and a plurality of predetermined time interval points following the predetermined time point. In some embodiments, the predetermined time point is set to be 1000 ms, and the predetermined time interval points are set to be points at intervals from the predetermined time point of every 500 ms, such as 1500 ms, 2000 ms, or the like, that is, the predetermined time point of 1000 ms and the corresponding time points at intervals of 500 ms from the predetermined time point of 1000 ms are determined to satisfy the preloading timing. At the above time points, the current device environment information and the current service environment information are acquired to determine whether the preload conditions are met until the preload conditions are met and the live stream resource is successfully preloaded.

It can be seen that in the case that the user device satisfies the pre-trigger scenario and the preload trigger timing is met, and the device environment information and the service environment information respectively meet the preload device condition and the preload service condition, the live stream resource is preloaded, and the preload is triggered at intervals under the condition of meeting the preload trigger timing. In this way, the live stream is preloaded without affecting the consumption experience of the short video, the switching between the short video and the live data is made more natural and smoother, and the user's consumption experience of the short video and the live stream is improved.

FIG. 2 is a flowchart of another method for preloading a live stream in a video stream according to some embodiments of the present disclosure. The method specifically includes the following processes.

In process S210, current device environment information and current service environment information are acquired in response to detecting a preload trigger scenario being satisfied during play of video stream data.

In process S220, whether the device environment information meets a preload device condition is determined, and whether the service environment information meets a preload service condition is determined.

In process S230, a preloading strategy is acquired from a server and a live stream resource is preloaded in response to the determination results that the preload device condition and the preload service condition are met.

In some embodiments, prior to preloading the live stream resource, it is also necessary to acquire the preloading strategy from the server, the preloading strategy being determined by the server based on acquired device basic information, the device basic information including at least one of a number of processor cores, a processor frequency, or a running memory of a device.

In some embodiments, the device basic information includes the number of processor cores, the processor frequency, and the running memory, and the server is able to determine, based on the aforementioned device basic information, a device class of the user device, so as to provide the user device with a preloading strategy corresponding to the device class. It can be expected that the server stores a corresponding preloading strategy corresponding to the device class of the user device. In some embodiments, for the user device with a low device class, the server sends a first preloading strategy to the user device, the first preloading strategy includes, such as, upon acquiring the resource of the live stream and entering the corresponding live stream, setting the play volume corresponding to the live stream to a predetermined volume, and then drawing a live screen of the live stream in a single pixel point mode.

As can be seen from the above solution, during the play of video stream data by the user device, it is detected whether the user device satisfies the preload trigger scenario. In the case that the user device satisfies the pre-trigger scenario, the device environment information and the service environment information respectively meet the preload device condition and the preload service condition, and the preloading strategy determined by the server based on the device basic information is acquired, the live stream resource is preloaded. In this way, the live stream can be preloaded, accommodating to different device classes of user devices, without affecting the consumption experience of the short video, such that the switching between the short video and the live data is natural and smooth, and the user's consumption experience of the short video and the live stream is improved.

FIG. 3 is a flowchart of another method for preloading a live stream in a video stream according to some embodiments of the present disclosure. The method specifically includes the following processes.

In process S310, current device environment information and current service environment information are acquired in response to detecting a preload trigger scenario being satisfied during play of video stream data.

In process S320, whether the device environment information meets a preload device condition is determined, and whether the service environment information meets a preload service condition is determined.

In process S330, a live stream resource is acquired and a live stream corresponding to the live stream resource is accessed in response to determination results that the preload device condition and the preload service condition are met.

In process S340, audio blocking and video stream play blocking are performed for the live stream.

In some embodiments, preloading the live stream resource includes: acquiring the live stream resource and entering the corresponding live stream; and performing audio blocking and video stream play blocking for the live stream. For the live stream that needs to be preloaded, the user device acquires the live stream resource, such as the encoding method of the live video, the screen resolution, the interface layout data, or the live stream data, etc.; enters the corresponding live stream, and performs the audio blocking and screen blocking for the live stream, so as to minimize the impact on the currently played short video, and to enhance the user's using experience.

In some embodiments, in the preloading process of the live stream resource, the resource of the live stream is acquired, and the corresponding live stream is accessed. The audio blocking and video stream play blocking for the live stream are achieved by setting the play volume corresponding to the live stream to a predetermined volume, and then drawing the live stream screen of the live stream in a single pixel point mode. It is understood that the predetermined volume is a predetermined play volume, which can be set as needed. In some embodiments, the play volume of the live stream is set to 0 during the process of preloading, i.e., the audio of the live stream is not played during the preloading process of the resource of the live stream. In some embodiments, the audio blocking for the live stream is achieved by disabling the audio data in the video stream data, and the audio data is resumed when playing the live video. In some embodiments, the screen of the live stream is drawn using a plurality of pixel dots. In some embodiments, the screen of the live stream is drawn in the system background of the user device to achieve the video stream play blocking for the live stream.

As can be seen from the above solution, during the play of video stream data by the user device, in the case that the user device satisfies the pre-trigger scenario, and the device environment information and the service environment information respectively meet the preload device condition and the preload service condition, the resource of the live stream is preloaded and the audio and screen of the live stream are blocked. In this way, the live stream is preloaded without affecting the consumption experience of the short video, such that the switching between short video and live stream data is natural and smooth, and the user's consumption experience of short videos and live streams is improved.

Figure 4:
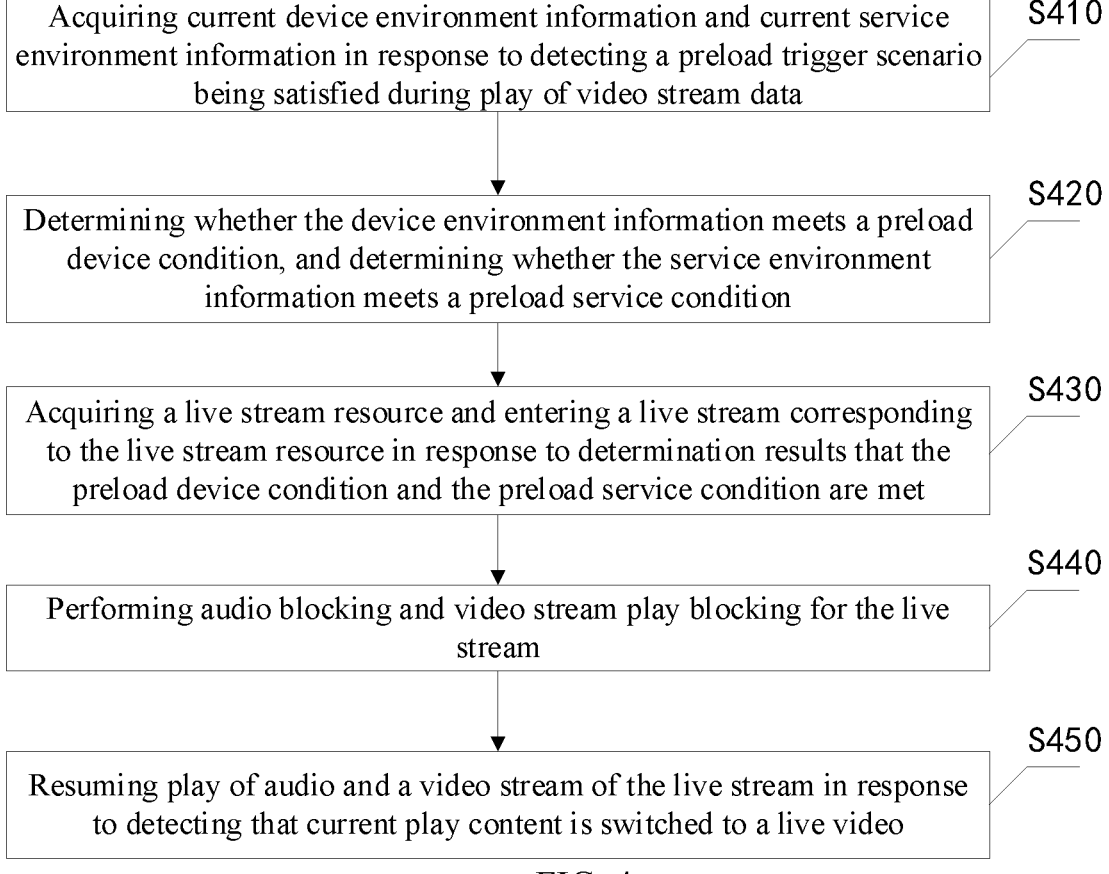
FIG. 4 is a flowchart of another method for preloading a live stream in a video stream according to some embodiments of the present disclosure.

FIG. 4 is a flowchart of another method for preloading a live stream in a video stream according to some embodiments of the present disclosure. The method specifically includes the following processes.

In process S410, current device environment information and current service environment information are acquired in response to detecting a preload trigger scenario being satisfied during play of video stream data.

In process S420, whether the device environment information meets a preload device condition is determined, and whether the service environment information meets a preload service condition is determined.

In process S430, a live stream resource is preloaded and a live stream corresponding to the live stream resource is accessed in response to determination results that the preload device condition and the preload service condition are met.

In process S440, audio blocking and video stream play blocking are performed for the live stream.

In process S450, the play of the audio and video stream of the live stream is resumed in response to detecting that currently played content is switched to a live video.

In some embodiments, in the case that a user switches a short video to a live video, and the user device detects that the currently played content is switched to the live video, the play of the audio and the video stream of the live stream is resumed, i.e., the audio blocking and video stream play blocking for the live stream are canceled, such that the audio and the screen of the live video are played on the user device.

In some embodiments, under an application scenario, in the case that the user device is currently playing a short video and satisfies a preload trigger scenario, and the current device environment information of the user device meets the preload device condition and the service environment information of the user device meets the preload service condition, the user device preloads the resource of the live stream, and performs audio blocking and screen blocking for the live stream. In the case that the user device detects that the currently played content is switched to a live video, i.e., switching from a short video to a live stream, the play of the audio and video stream in the live stream is resumed, i.e., the audio and screen of the short video is turned off, and at the same time the audio of the live stream is resumed to be with a default volume such as the user device's current volume, i.e., the volume for playing the short video, and the live stream screen is resumed to display the live stream normally.

Figures 5, 6:
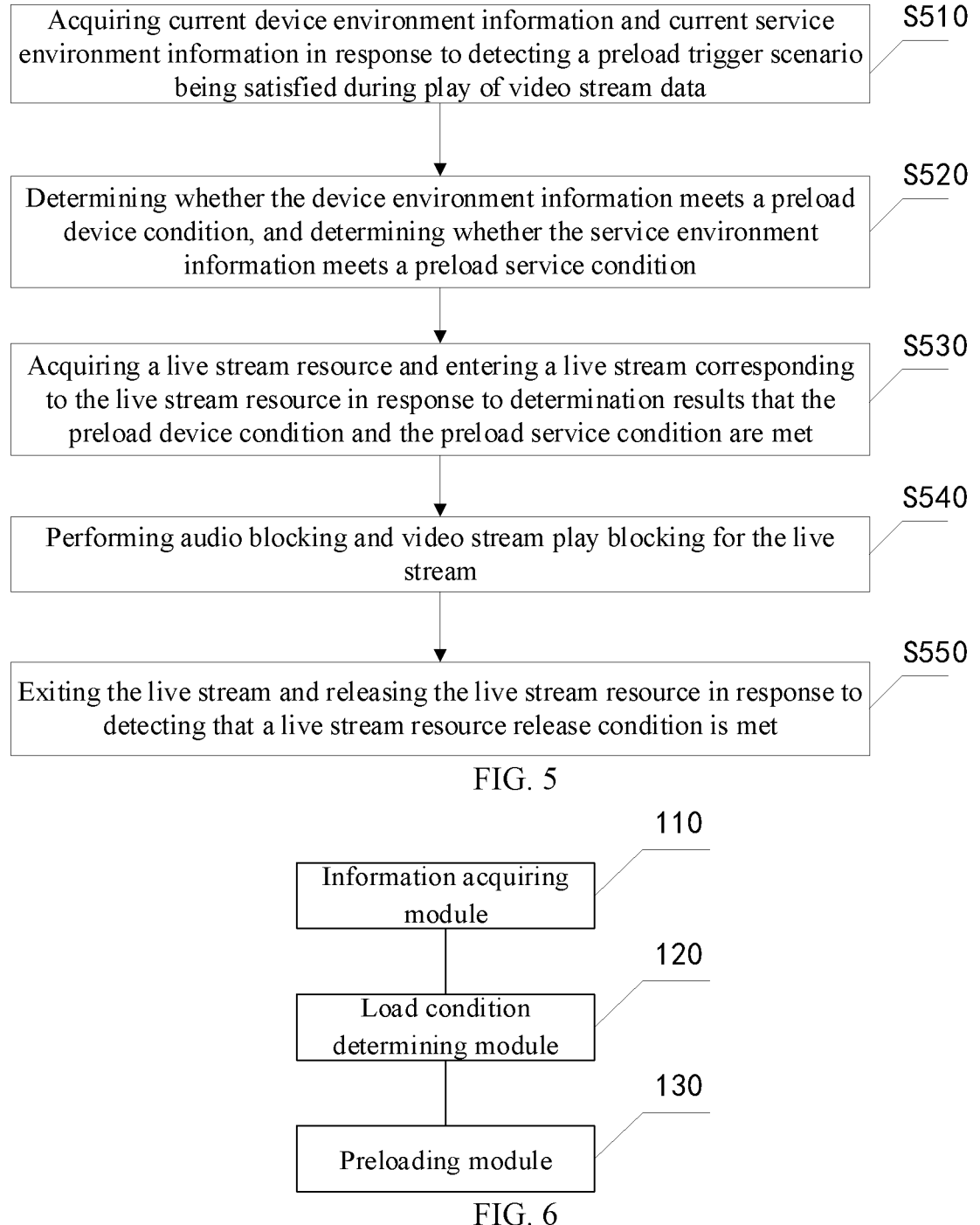
FIG. 5 is a flowchart of another method for preloading a live stream in a video stream according to some embodiments of the present disclosure.
FIG. 6 is a structural block diagram of an apparatus for preloading a live stream in a video stream according to some embodiments of the present disclosure.

FIG. 5 is a flowchart of another method for preloading a live stream in a video stream according to some embodiments of the present disclosure. The method specifically includes the following processes.

In process S510, current device environment information and current service environment information are acquired in response to detecting a preload trigger scenario being satisfied during play of video stream data.

In process S520, whether the device environment information meets the preload device condition is determined, and whether the service environment information meets the preload service condition is determined.

In process S530, a live stream resource is acquired and a live stream corresponding to the live stream resource is accessed in response to determination results that the preload device condition and the preload service condition are met.

In process S540, audio blocking and video stream play blocking are performed for the live stream.

In process S550, the live stream is closed and the resource of the live stream is released in response to detecting that a live stream resource release condition is met.

In some embodiments, upon preloading the live stream resource, it is detected whether the live stream resource release condition is met, and in the case that it is detected that the live stream resource release condition is met, the live stream is closed and the live stream resource is released, wherein the live stream resource release condition includes at least one of a predetermined operation condition, a network change condition, a background operation condition, or a secondary page switch condition.

It is understood that the predetermined operation condition includes determining that the current operation instruction is a reverse instruction, wherein the reverse instruction is an operation instruction received by the user device under a preload trigger scenario in response to a reverse swipe operation of the user to make the play content switch from a short video to another short video. In some embodiments, according to a play order of video stream data, the currently played video stream data is short video I, the previously played video stream data is short video II, next video stream data to be played is a live stream, and in response to the user's reverse swipe operation, the user device switches from playing short video I to playing short video II, which satisfies the predetermined operation condition. Therefore, the live stream is closed and the resource of the live stream is released.

The network change condition includes determining that the changed network type satisfies exceeding the predetermined network type. In some embodiments, the predetermined network type includes 4G, 5G, or Wi-Fi, in the case that the changed network type of the user device is 3G, it is determined that the changed network type is not the predetermined network type, i.e., the changed network type is inconsistent with the predetermined network type, which satisfies the network change condition, and then the user device exits the live stream and releases the live stream resource.

The background operation condition includes determining that the video stream data is in the system background. In some embodiments, the video stream data (i.e., a short video and a live stream) is played on a video application, and in the case that the user switches the video application from the foreground to the background of the user device, the background operation condition is satisfied, and then the user device exits the live stream and releases the live stream resource.

The secondary page switch condition includes determining that the current page is switched to a secondary page. In some embodiments, in a video application, the user can enter a secondary page such as a comment area page, a video publisher page, and other pages in addition to a page for currently playing the video stream data. In the case that the user device determines that the current page is a secondary page, which satisfies the secondary page switch condition, the live stream is closed and the live stream resource is released.

FIG. 6 is a structural block diagram of an apparatus for preloading a live stream in a video stream according to some embodiments of the present disclosure. The apparatus is configured to perform the method for preloading a live stream in a video stream according to the above embodiments, and the apparatus includes corresponding functional modules for performing the method and achieves corresponding beneficial effects. As shown in FIG. 6, the apparatus includes an information acquiring module 110, a load condition determining module 120, and a preloading module 130.

The information acquiring module 110 is configured to acquire current device environment information and current service environment information in response to detecting a preload trigger scenario being satisfied during play of video stream data.

The load condition determining module 120 is configured to determine whether the device environment information meets a preload device condition, and determine whether the service environment information meets a preload service condition.

The preloading module 130 is configured to preload a live stream resource in response to determination results that the preload device condition and the preload service condition are met.

As can be seen from the above solution, during the play of video stream data, in the case that the pre-trigger scenario is satisfied, and the device environment information and the service environment information respectively meet the preload device condition and the preload service condition, the live stream resource is preloaded. In this way, the live stream is preloaded without affecting the consumption experience of the short video, such that the switching between the short video and the live stream data is natural and smooth, and the user's consumption experience of short videos and live streams is improved.

In some embodiments, the information acquiring module 110 is configured to detect that the play content is switched by the swipe-up operation, and the current play data is a short video and the next play data is a live video; or, the play content is switched by the swipe-down operation, and the current play data is a short video and the previous play data is a live video.

In some embodiments, the information acquiring module 110 is configured to acquire the current device environment information and the current service environment information in response to a preload trigger timing being satisfied, wherein the preload trigger timing includes that the short video is played up to a predetermined time point or a predetermined time interval point following the predetermined time point.

In some embodiments, the device environment information includes one or more of a network type, a network bandwidth, and a short video download bandwidth, and the load condition determining module 120 is configured to:

determine whether the network type is a predetermined network type; determine whether the network bandwidth is greater than a predetermined network bandwidth threshold; or determine whether the short video download bandwidth is greater than a predetermined download bandwidth threshold.

In some embodiments, the service environment information includes at least one of short video download data or short video cache data, and the load condition determining module is configured to perform at least one of:

determining, based on the short video download data, whether the short video is completely downloaded; or determining, based on the short video cache data, whether a duration that the short video has been cached but is not played is greater than a predetermined time period.

In some embodiments, the preloading module 130 is configured to:

acquire a preloading strategy from a server, the preloading strategy being determined by the server based on acquired device basic information, the device basic information including at least one of a number of processor cores, a processor frequency, or a running memory of a device.

In some embodiments, the preloading module 130 is configured to:

acquire the live stream resource and enter the live stream corresponding to the live stream resource; and perform audio blocking and video stream play blocking for the live stream.

In some embodiments, the preloading module 130 is configured to:

set a play volume corresponding to the live stream to a predetermined volume; and draw a live screen of the live stream in a single pixel point mode.

In some embodiments, the preloading module 130 is configured to:

resume play of audio and a video stream of the live stream in response to detecting that current play content is switched to a live video.

In some embodiments, the preloading module 130 is configured to:

close the live stream and release the live stream resource in response to detecting that a live stream resource release condition is met, wherein the live stream resource release condition includes at least one of a predetermined operation condition, a network change condition, a background operation condition, or a secondary page switch condition.

Figure 7:
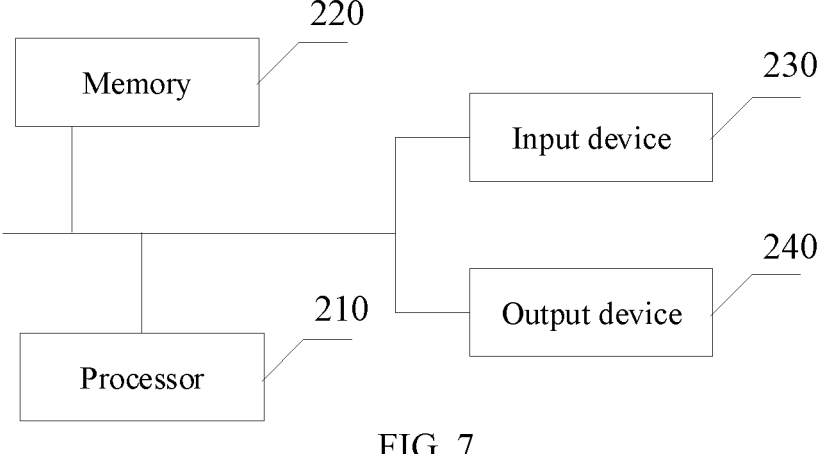
FIG. 7 is a schematic structural diagram of a device for preloading a live stream in a video stream according to some embodiments of the present disclosure.

FIG. 7 is a schematic structural diagram of a device for preloading a live stream in a video stream according to some embodiments of the present disclosure. As shown in FIG. 7, the device includes a processor 210, a memory 220, an input device 230, and an output device 240. In some embodiments, one or more processors 210 are provided in the device, and only one processor 210 is shown in FIG. 7 as an example. In some embodiments, the processor 210, the memory 220, the input device 230, and the output device 240 are connected via a bus or in other ways, and FIG. 7 exemplarily illustrates connection via a bus. In some embodiments, the memory 220, as a computer-readable storage medium, is configured to store one or more software programs, one or more computer-executable programs, and one or more modules, such as program instructions/modules corresponding to the method for preloading a live stream in a video stream according to some embodiment of the present disclosure. The processor 210, when executing the software program, the instruction, or the modules stored in the memory 220, is caused to perform the various functional applications or data processing of the device, i.e., the methods for preloading the live stream in the video stream. The input device 230 is configured to receive input numeric or character information, and generate key signal inputs related to user settings as well as function control of the device. The output device 240 includes a display device such as a display screen.

The embodiments of the present disclosure further provide a storage medium including one or more computer-executable instructions. The one or more computer-executable instructions, when executed by a processor of a computer, cause the computer to perform the method for preloading a live stream in a video stream as described in the above embodiments, wherein the method includes:

acquiring current device environment information and current service environment information in response to detecting a preload trigger scenario being satisfied during play of video stream data;

determining whether the device environment information meets a preload device condition, and determining whether the service environment information meets a preload service condition; and preloading a live stream resource in response to determination results that the preload device condition and the preload service condition are met.

It is worth noting that the various units and modules included in the above embodiment of the apparatus for preloading the live stream in the video stream are only divided in accordance with a functional logic, but are not limited to the above-described division, as long as the corresponding functions can be achieved. Furthermore, the specific names of the various functional units are only for the purpose of distinguishing each other, and are not intended to limit the scope of protection of the embodiments of the present disclosure.

In some possible embodiments, aspects of the method according to the present disclosure are realized in the form of a program product including one or more program codes. The one or more program codes, when run by a computer device, cause the computer device to perform the processes in the method according to various exemplary embodiments of the present disclosure described above in the specification. In some embodiments, the computer device performs the method for preloading a live stream in a video stream as documented in embodiments of the present disclosure. In some embodiments, the program product is implemented by the combination of one or more readable media.

The invention claimed is:

1. A method for preloading a live stream in a video stream, the method comprising:

acquiring current device environment information and current service environment information in response to detecting a preload trigger scenario being satisfied during play of video stream data, wherein the preload trigger scenario comprises: current play data being a short video and next play data being a live video in a case of switching play content by a swipe-up operation; or current play data being a short video and previous play data being a live video in a case of switching play content by a swipe-down operation;

the device environment information comprises one or more of a network type, a network bandwidth, and a short video download bandwidth; and the service environment information comprises at least one of short video download data or short video cache data;

determining whether the device environment information meets a preload device condition, and determining whether the service environment information meets a preload service condition; and preloading a live stream resource in response to determination results that the preload device condition and the preload service condition are met.

2. The method according to claim 1, wherein acquiring the current device environment information and the current service environment information comprises:

acquiring the current device environment information and the current service environment information in response to a preload trigger timing being satisfied, wherein the preload trigger timing comprises the short video being played up to a predetermined time point or a predetermined time interval point following the predetermined time point.

3. The method according to claim 1 determining whether the device environment information meets the preload device condition comprises at least one of:

determining whether the network type is a predetermined network type;

determining whether the network bandwidth is greater than a predetermined network bandwidth threshold; or determining whether the short video download bandwidth is greater than a predetermined download bandwidth threshold.

4. The method according to claim 1 determining whether the service environment information meets the preload service condition comprises at least one of:

determining, based on the short video download data, whether a short video is completely downloaded; or determining, based on the short video cache data, whether a duration that the short video has been cached but is not played is greater than a predetermined time period.

5. The method according to claim 1, wherein prior to preloading the live stream resource, the method further comprises:

acquiring a preloading strategy from a server, the preloading strategy being determined by the server based on acquired device basic information, the device basic information comprising at least one of a number of processor cores, a processor frequency, or a running memory of a device.

6. The method according to claim 1, wherein preloading the live stream resource comprises:

acquiring the live stream resource and entering the live stream corresponding to the live stream resource; and performing audio blocking and video stream play blocking for the live stream.

7. The method according to claim 6, wherein performing audio blocking and video stream play blocking for the live stream comprises:

setting a play volume corresponding to the live stream to a predetermined volume; and drawing a live screen of the live stream in a single pixel point mode.

8. The method according to claim 6, wherein upon preloading the live stream resource, the method further comprises:

resuming play of audio and a video stream of the live stream in response to detecting that current play content is switched to a live video.

9. The method according to claim 6, wherein upon preloading the live stream resource, the method further comprises:

exiting the live stream and releasing the live stream resource in response to detecting that a live stream resource release condition is met, wherein the live stream resource release condition comprises at least one of a predetermined operation condition, a network change condition, a background operation condition, or a secondary page switch condition.

10. A device for preloading a live stream in a video stream, comprising: a processor, a memory, and one or more computer programs stored in the memory and runnable on the processor, wherein the processor, when loading and running the one or more computer programs, is caused to perform: acquiring current device environment information and current service environment information in response to detecting a preload trigger scenario being satisfied during play of video stream data, wherein the preload trigger scenario comprises: current play data being a short video and next play data being a live video in a case of switching play content by a swipe-up operation; or current play data being a short video and previous play data being a live video in a case of switching play content by a swipe-down operation;

the device environment information comprises one or more of a network type, a network bandwidth, and a short video download bandwidth; and the service environment information comprises at least one of short video download data or short video cache data;

determining whether the device environment information meets a preload device condition, and determining whether the service environment information meets a preload service condition; and preloading a live stream resource in response to determination results that the preload device condition and the preload service condition are met.

11. A non-transitory computer-readable storage medium storing one or more computer-executable instructions, wherein the one or more computer-executable instructions, when loaded and executed by a processor of a computer, cause the computer to perform:

acquiring current device environment information and current service environment information in response to detecting a preload trigger scenario being satisfied during play of video stream data, wherein the preload trigger scenario comprises: current play data being a short video and next play data being a live video in a case of switching play content by a swipe-up operation; or current play data being a short video and previous play data being a live video in a case of switching play content by a swipe-down operation;

the device environment information comprises one or more of a network type, a network bandwidth, and a short video download bandwidth; and the service environment information comprises at least one of short video download data or short video cache data;

determining whether the device environment information meets a preload device condition, and determining whether the service environment information meets a preload service condition; and preloading a live stream resource in response to determination results that the preload device condition and the preload service condition are met.

12. A computer program product comprising a computer program, wherein the computer program, when executed by a processor, causes the processor to perform the method for preloading the live stream in the video stream as defined in claim 1.

13. The device according to claim 10, wherein the processor, when loading and running the one or more computer programs, is caused to perform:

acquiring the current device environment information and the current service environment information in response to a preload trigger timing being satisfied, wherein the preload trigger timing comprises the short video being played up to a predetermined time point or a predetermined time interval point following the predetermined time point.

14. The device according to claim 10, wherein the processor, when loading and running the one or more computer programs, is caused to perform:

determining whether the network type is a predetermined network type;

determining whether the network bandwidth is greater than a predetermined network bandwidth threshold; or determining whether the short video download bandwidth is greater than a predetermined download bandwidth threshold.

15. The device according to claim 10, wherein the processor, when loading and running the one or more computer programs, is caused to perform at least one of:

determining, based on the short video download data, whether a short video is completely downloaded; or determining, based on the short video cache data, whether a duration that the short video has been cached but is not played is greater than a predetermined time period.

16. The device according to claim 10, wherein the processor, when loading and running the one or more computer programs, is caused to perform:

acquiring a preloading strategy from a server, the preloading strategy being determined by the server based on acquired device basic information, the device basic information comprising at least one of a number of processor cores, a processor frequency, or a running memory of a device.

17. The device according to claim 10, wherein the processor, when loading and running the one or more computer programs, is caused to perform:

acquiring the live stream resource and entering the live stream corresponding to the live stream resource; and performing audio blocking and video stream play blocking for the live stream.

18. The device according to claim 17, wherein the processor, when loading and running the one or more computer programs, is caused to perform:

setting a play volume corresponding to the live stream to a predetermined volume; and drawing a live screen of the live stream in a single pixel point mode.

19. The device according to claim 17, wherein the processor, when loading and running the one or more computer programs, is caused to perform:

resuming play of audio and a video stream of the live stream in response to detecting that current play content is switched to a live video.

20. The device according to claim 17, wherein the processor, when loading and running the one or more computer programs, is caused to perform:

exiting the live stream and releasing the live stream resource in response to detecting that a live stream resource release condition is met, wherein the live stream resource release condition comprises at least one of a predetermined operation condition, a network change condition, a background operation condition, or a secondary page switch condition.

* * * * *